(12) United States Patent
Kawai et al.

(10) Patent No.: US 6,647,666 B2
(45) Date of Patent: Nov. 18, 2003

(54) SEALING STRUCTURE OF OPENING SECTION IN VEHICLE

(75) Inventors: Katsunori Kawai, Nishikasugai-gun (JP); Hisao Hanabusa, Nishikasugai-gun (JP); Takao Nakajima, Nishikasugai-gun (JP); Harumi Kogiso, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/986,753

(22) Filed: Nov. 9, 2001

(65) Prior Publication Data
US 2002/0026751 A1 Mar. 7, 2002

Related U.S. Application Data

(63) Continuation-in-part of application No. 09/803,940, filed on Mar. 13, 2001, now Pat. No. 6,385,839.

(30) Foreign Application Priority Data

| Feb. 13, 1998 | (JP) | 10-031725 |
| Feb. 7, 2001 | (JP) | 2001-030505 |

(51) Int. Cl.$^7$ .............................. E06B 7/16; E06B 3/00
(52) U.S. Cl. .......................... 49/479.1; 49/506
(58) Field of Search ........................... 49/479.1, 498.1, 49/475.1, 440, 441, 506; 277/921, 628, 906, 645, 648; 264/167; 298/451

(56) References Cited

U.S. PATENT DOCUMENTS

| 4,531,326 A | | 7/1985 | Ballocca et al. |
| 4,576,773 A | * | 3/1986 | Azzola et al. ............... 264/167 |
| 4,619,077 A | * | 10/1986 | Azzola et al. ............... 49/497 |
| 4,960,375 A | | 10/1990 | Saito et al. |
| 4,964,620 A | * | 10/1990 | Omura et al. ............... 264/261 |
| 4,979,333 A | | 12/1990 | Goto et al. |
| 4,998,946 A | * | 3/1991 | Nozaki ...................... 49/497 |
| 5,067,280 A | * | 11/1991 | Arima ....................... 49/498 |
| 5,099,612 A | * | 3/1992 | Hayashi et al. ............ 49/479 |
| 5,240,664 A | | 8/1993 | Hayashi |
| 5,447,670 A | | 9/1995 | Ito et al. |
| 5,626,383 A | | 5/1997 | Lee et al. |
| 5,715,632 A | * | 2/1998 | Nozaki .................... 49/475.1 |
| 5,958,318 A | | 9/1999 | Hayashi |

FOREIGN PATENT DOCUMENTS

| EP | 407 364 | 1/1991 |
| JP | 1-168346 | 11/1989 |
| JP | 2-26934 | 2/1990 |
| JP | 11-227471 | 8/1999 |

\* cited by examiner

*Primary Examiner*—Hugh B. Thompson
(74) *Attorney, Agent, or Firm*—Posz & Bethards, PLC

(57) ABSTRACT

A door weather strip, which is of annular form as a whole, includes a base section and a hollow sealing section as its basic constituent elements. The portion of the door weather strip corresponding to the corner part of the upper portion on the center pillar side of the front door provides a molded section, and any other section provides a continuously formed extrusion section. On the portion other than the lower side portion in the peripheral portion of the opening section for the front door of a vehicle body, the ridge portion as along the peripheral portion thereof is provided. In the closed state of the front door, the sealing section is elastically deformed so as to be pressed and extended in opposite directions away from the top portion of the ridge portion.

12 Claims, 9 Drawing Sheets

SEALING STRUCTURE OF OPENING SECTION IN VEHICLE

This application is a continuation-in-part application of Ser. No. 09/803,940, filed on Mar. 13, 2001 now U.S. Pat. No. 6,385,839 which is incorporated herein by reference.

BACKGROUND OF THE INVENTION

1. Field of the Invention

The present invention relates to a sealing structure of an opening section in a vehicle, which is arranged to provide a seal between a front or rear door of a vehicle and a vehicle body by the use of a weather strip which is mounted on the peripheral portion of the front or rear door of the vehicle.

2. Description of the Related Art

Conventionally, a sealing structure of this type has used a door weather strip which is mounted on the periphery of a front or rear door of a vehicle to provide a seal between the door and the vehicle body. Then, as the door weather strip which is mounted on the front door, for example, there is cited the one shown in FIGS. 13 and 14. FIG. 13 is a side view of the same weather strip. FIG. 14A is a sectional view taken along line Ia—Ia of FIG. 13. FIG. 14B is a sectional view taken along line Ib—Ib of FIG. 13. And FIG. 14C is a sectional view taken along line Ic—Ic of FIG. 13. In the weather strip of this type, its mainly substantially straight part is formed by extrusion, and its corner part small in the radius of curvature is formed by using a mold (cf. Japanese Utility Model Publication No. Hei. 1-168346, Japanese Utility Model Publication No. Hei. 2-26934, or the like). The weather strip fundamentally comprises a base section which is mounted on the periphery of a door, and a hollow sealing section which is extended from the base section, and is formed, for instance, with EPDM solid rubber or sponge rubber.

As shown in FIG. 13, a front door weather strip 100 includes a plurality (three in this example) of substantially linearly extrusion sections, i.e., a first extrusion section 101, a second extrusion section 102, and a third extrusion section 103. Then, the individual extrusion sections 101 to 103 are connected to each other at the respective ends by a plurality (three in this example) of molded sections 104. Here, the first extrusion section 101 is formed so as to correspond substantially to the upper portion of a front door not shown and substantially the upper half of the forward side portion of the front door, the second extrusion section 102 to substantially the lower half of the forward side portion of the front door, and the third extrusion section 103 to the lower portion and rearward side portion of the front door.

The reason why the molded sections 104 are provided is as follows: If the whole weather strip is formed by extrusion suffers from the following trouble: In the case where the corner is small in the radius of curvature, and it is desired to curve the extrusion section along the corner part, the corner part is deformed in such a manner that the hollow sealing section collapses; that is, a predetermined sealing force cannot be obtained. The extrusion sections are greatly different in sectional configuration from each other, the molded section is provided at the junction of the extrusion sections.

As shown in FIGS. 14A to 14C, the front door weather strip has each extrusion section 101 to 103 thereof provided with a base section 105, a hollow sealing section 106, and the back seal 107 projecting outwardly from the sealing section 106 in common. Further, although not shown in the figures, the front door weather strip also has each molded section 104 provided with the base section, the sealing section, and the back seal which are connected respectively to the base section 105, sealing section 106, the back seal 107 of the extrusion section 101 to 103 which is connected to the molded section 104.

The sealing lip 108 outwardly extended from substantially the middle of the back seal 107 of the first extrusion section 101 is formed integrally with the first extrusion section 101. However, the sealing lip 108 is not formed on the second or third extrusion section 102, 103, and is continuously gradually changed in length in the molded section 104 which connects the first and second extrusion sections 101 and 102 to each other.

When the front door is changed from an open state to a closed state, such a front door weather strip 100 is subjected to elastic deformation with the sealing section 106 in contact with the peripheral portion 110 of the opening section of the vehicle body. Thus, between the vehicle body and the front door, the inside and outside of a vehicle cabin is sealed air-tight and water-tight via the front door weather strip 100.

However, the molded section 104 has a borderline in making the sealing section thereof thinner, and the sealing section of the molded section 104 tends to become thicker than the sealing section 106 of the extrusion section 101 to 103. Thereby, the sealing section of the molded section 104 becomes large in rigidity, and the reaction force by the sealing section of the molded section 104, i.e., the force acting in the direction in which the front door is changed from the closed state to the open state becomes large relative to the door closing force upon closing the front door. Consequently, the resistance upon closing the front door becomes large, and there is a possibility of deteriorating the feeling of closing the front door. Particularly, in case a plurality of molded sections 104 are provided as in the front door weather strip shown in FIGS. 13 and 14A, the deterioration in feeling of closing the door becomes more remarkable.

The above-described weather strip 100 has the following problems: The front door weather strip needs three extrusion sections 101, 102 and 103, and three molded sections 104. Therefore, those sections 101, 102, 103 and 104 must be formed in different manufacturing steps, and accordingly the number of manufacturing steps is considerably large; that is, the manufacturing work is low in efficiency, and the manufacturing cost is large.

Further, in those front door weather strips, with the one shown in FIGS. 13 and 14A cited as an example, when the sealing section 106 and the peripheral portion 110 of the opening section 110 are brought into contact with each other in order to close the front door, the sealing section 106 of the front door weather strip 100 is arranged, for example in the mode shown dotted in FIG. 14A, to be elastically deformed with the whole thereof being inclined toward one side with respect to a center line m. Thus, a sliding friction is generated in the contact portion between the sealing section 106 and the peripheral portion 110 of the opening section of the vehicle of the vehicle body, and a more resistance comes to be generated upon closing the front door. Hence, there is a problem that the door closing force is increased upon closing the door, and also the feeling of closing the door is further deteriorated. Also, because of the two-dimensional pressure contact between the peripheral portion 110 of the opening section and the side wall portion of the hollow sealing section 106, sealing properties are deteriorated due to wear-out compression-set, durability, etc.

Further, not only in case of the front door, but also in case of the rear door, such actual circumstances have generally been common.

SUMMARY OF THE INVENTION

The invention is made by paying attention to such problems as lying in the conventional sealing structure. An object of the invention is to provide a sealing structure of the opening section in the vehicle by which the feeling of closing the front or rear door is improved, and also the movement of the sealing section is prevented against compression-set, durability, abrasion, etc., thus enabling improvement in sealing properties.

Another object of the invention is to provide a door weather strip and its manufacturing method which are designed as follows: The manufacturing work is high in efficiency, and manufacturing cost is low, and substantially the same sealing force is obtained at any point of the weather strip.

In order to attain the aforesaid object, according to one aspect of the present invention, there is provided a sealing structure of the opening section in the vehicle, which provides a seal between the vehicle body and the front or rear door by the use of the weather strip including the base section which is mounted on the peripheral portion of the front or rear door of the vehicle and the hollow sealing section which is formed integrally with the base section and is in elastically contact with the peripheral portion of the opening section of the vehicle body in the closed state of the front or rear door, the sealing structure of the opening section in the vehicle is arranged such that in the weather strip, the portion corresponding to the corner part of the upper portion on the center pillar side constituting part of the peripheral portion of the opening section of the vehicle body in the front or rear door is formed of the molded section molded by a molding method, and any other section is formed of the extrusion section formed by an extrusion method, and that in the peripheral portion of the opening section of the vehicle body, a ridge portion is provided as along at least part of the peripheral portion of the opening section, and in the closed state of the front or rear door, the sealing section is elastically deformed while being pressed and extended by the ridge portion in opposite directions away from the top portion of the ridge portion.

In this invention, since the sealing section of the weather strip is, upon closing each door, elastically deformed while being pressed and extended in opposite directions away from the top portion of the ridge portion formed on the peripheral portion of the opening section of the vehicle, a sliding friction force becomes difficult to generate between the sealing section and the peripheral portion. Consequently, the door closing force upon closing each door can be suppressed, and also the feeling can be improved. Also, since the sealing section is not largely tiltingly moved in deformation mode, but deformed in the direction of compression at the mounting position thereof, the deterioration in sealing properties accompanying the movement of the seal section can be prevented to improve sealing properties.

A sealing member formed separately from the weather strip may be mounted on at least one of the upper and side portions of the front or rear door.

Here, as shown in FIG. 14A, in the conventional weather strip 100, in some cases, the sealing lip 108 is formed in order to improve sealing properties, sound insulating properties, etc. However, in the sealing lip 108, the height thereof is relatively large, and moreover the height thereof is formed so as to be gradually changed in each longitudinal end portion. Hence, also in the variable extrusion method using a variable die, an advanced technique has been required in order to form the sealing lip 108.

In contrast, the sealing member playing the role equal to that of the sealing lip can be formed separately from the weather strip in the above invention, whereby there is no need for forming the sealing lip on the weather strip. Thus, any other section than the molded section in the weather strip, without being largely changed in sectional form, can be easily formed by the variable extrusion method using the variable die.

Further, in the closed state of the front or rear door, the amount of elastic deformation of the sealing section in the portion below the vicinity of the belt line portion of each door may be set to be smaller than that in any other portion.

The sliding frictional force caused between the sealing section and the peripheral portion of the opening section is further reduced upon closing each door. Thus, the door closing force upon closing each door can be reduced to further improve the feeling of closing the door. Further, since the sealing properties which are required of the portion below the vicinity of the belt line portion of each door are lower than those of any other portion, even if the amount of elastic deformation of the sealing section is thus reduced, no hindrance is constituted to the sealing properties.

Further, the height of the sealing section in the portion below the vicinity of the belt line portion of the front or rear door is preferably set to be lower than that in any other portion.

Still further, the projection height of the ridge portion in the peripheral portion of the opening section of the vehicle body corresponding to the portion below the vicinity of the belt line portion of the front or rear door is preferably set to be lower than that in any other portion.

The height of the sealing section or the projection height of the ridge portion on the peripheral portion of each door can be as described above, thereby reducing the amount of elastic deformation of the sealing section in the portion below the vicinity of the belt line portion.

The weather strip is formed such that the sectional form of at least one of the forward and rearward side portions thereof in the vicinity of the portion corresponding to the belt line portion of the front or rear door is gradually changed.

Further, a smooth continuation becomes available between the upper and lower portions in the vicinity of the belt line portion of the weather strip which are different in degree of requirement for sealing properties.

To achieve the forgoing object, according to another aspect of the present invention, there is provided a front door weather strip provided with a base section mounted on a periphery of a front door of a vehicle, and a hollow sealing section extended from the base section. The weather strip has an annular shape as a whole, the base section and the hollow sealing section are formed all over a periphery of the weather strip. Further, the weather strip comprises a molded section corresponding to a corner part of a rear side upper section of the front door, the mold molding being formed with a mold, and an extrusion section being formed continuous by extrusion. The extrusion section comprises: a first part corresponding to a region of from an upper section to a front side section of the front door, the first part having a seal lip; a second part corresponding to a corner part between the upper section and the front side section of the front door; a third part corresponding to the front side section; a fourth part corresponding to a corner part between the front side section and a lower section of the front door, a height of the hollow sealing section at the fourth part is larger than other parts in the weather strip; and a fifth part corresponding to the lower section and a rear side section of the front door. A base end of the sealing section on a vehicle outside at least the lower section of the fifth part is smaller in thickness than that of a part in the first part corresponding to the upper section of the front door.

Preferably, a length of the seal lip is gradually changed so as to become zero at the second part.

Further, both side walls of the hollow sealing section at the fourth part may be added to a same volume substantially uniformly thickness, so that a height of the hollow sealing section at the fourth part is larger than other parts in the weather strip.

According to still another aspect of the present invention, there is provided a method for manufacturing a front door weather strip provided with a base section mounted on a periphery of a front door of a vehicle, and a hollow sealing section extended from the base section. The weather strip has an annular shape as a whole, the base section and the hollow sealing section are formed all over a periphery of the weather strip. The method comprises the steps of: (A) continuously forming one extrusion section by extrusion, comprising the steps of: forming a first part corresponding to a region of from an upper section to a front side section of the front door, the first part having a seal lip integral with the hollow sealing section; forming a second part corresponding to a corner part between the upper section and the front side section of the front door, a length of the seal lip being gradually changed so as to become zero, and the hollow sealing section being changed to a substantially circular shape from a shape of the hollow sealing section at the first part; forming a third part corresponding to the front side section, the hollow sealing section being changed to an elliptic shape from the substantially circular shape of the hollow sealing section at the second part; forming a fourth part corresponding to a corner part between the front side section and a lower section of the front door, a height of the hollow sealing section at the fourth part is larger than other parts in the weather strip; and forming a fifth part corresponding to the lower section and a rear side section of the front door, wherein a base end of the sealing section on a vehicle outside in at least the lower section of the fifth part is smaller in thickness than that of a part in the first part corresponding to the upper section of the front door; and (B) forming a molded section corresponding to a corner part of a rear side upper section of the front door using a mold so as to connect both ends of the extrusion section, thereby manufacturing the front door weather strip.

The step (A) may be executed using an extrusion machine having a die of which an opening is variable in configuration.

According to the present invention, the front door weather strip is annular as a whole, and its base section is attached to the periphery of the front door of the vehicle. And the hollow sealing section extended from the base section seals the gap between the front door and the vehicle body.

In the invention, the weather strip is made up of one extrusion section and one molded section through which both end of the extrusion section are connected to each other. Hence, the number of manufacturing steps is considerably small.

In addition, the part of the extrusion section which corresponds to the region of from the upper section of the front door to the front side section has the seal lip which is formed integral with the sealing section, and the length of the seal lip is gradually changed at a corner part between the upper section and the front side section.

Furthermore, in the part which corresponds to the corner section between the front side section and the lower section of the front door, the hollow sealing section is larger in height than the other parts. Therefore, even if, when the weather strip is fixed to the front door, the part is bent and therefore the sealing section collapses somewhat; that is, it is deformed, the deformation is estimated in advance. That is, when the extrusion section is bent, the height of the sealing section of the part thus deformed is almost equal to the height of the other part. Accordingly, the sealing force will never be decreased.

In the part which corresponds to the upper section of the front door, in order to prevent the suction deformation of the door during the high speed driving, it is necessary to obtain a predetermined lap margin and to increase the sealing force. Therefore, the sealing section should have a predetermined thickness. On the other hand, if the sealing force is too high, the front door closing force is increased.

Therefore, the present invention has the above-described function and the following function: In the part which corresponds to the lower section of the front door, a base end of the sealing section on a vehicle outside in at least lower section of the fifth part is smaller in thickness than that of a part in the first part corresponding to the upper section of the front door. Therefore, the front door closing force is not increased so much. Hence, the above-described function is more positively obtained.

Features and advantages of the invention will be evident from the following detailed description of the preferred embodiments described in conjunction with the attached drawings.

DETAILED DESCRIPTION OF THE PREFERRED EMBODIMENTS

First Embodiment

A front door weather strip, which constitutes a first embodiment of the invention, will be described with reference to FIG. 1 through FIG. 7.

Figure 1:
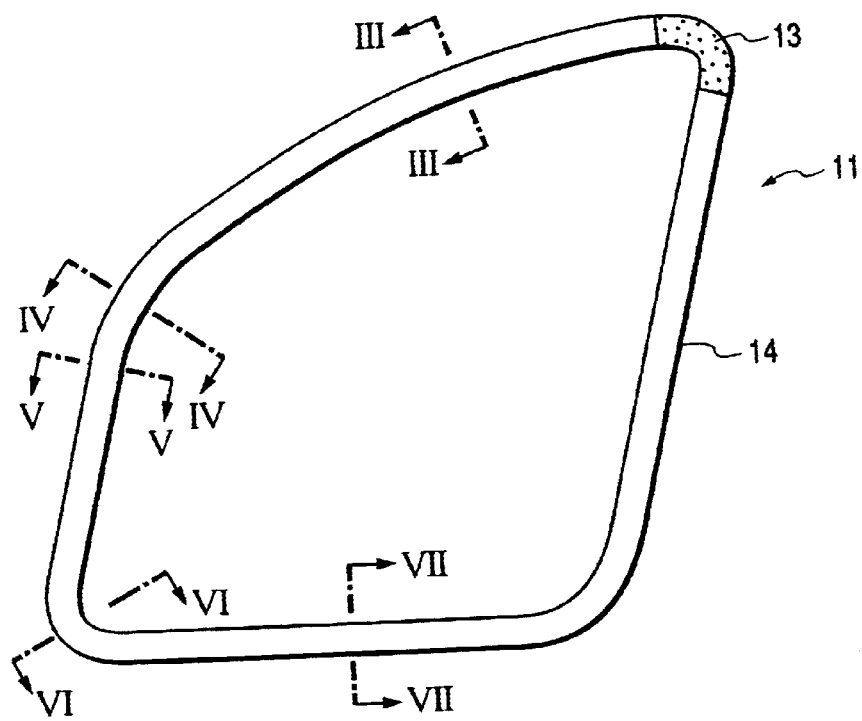
FIG. 1 is a side view showing a front door weather strip, which constitutes an embodiment of the invention.
Figure 2:
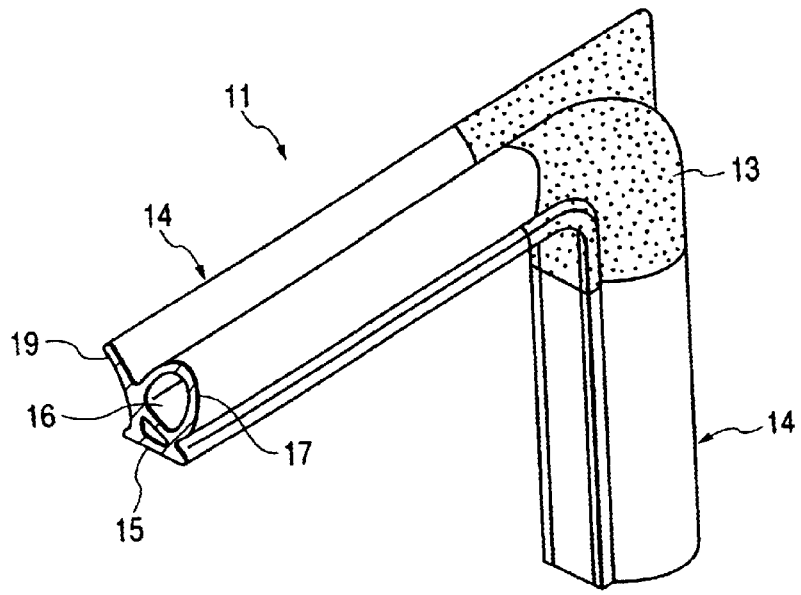
FIG. 2 is a perspective view mainly showing a molded section of the weather strip.
Figure 3:
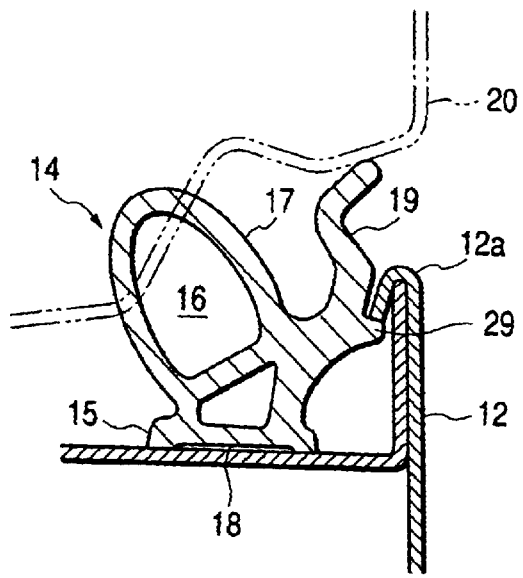
FIG. 3 is a sectional view taken along line III—III of FIG. 1, showing the coupling of the weather strip to the front door.

As shown in FIGS. 1 and 3, the front door weather strip (hereinafter referred to as "a weather strip when applicable) 11 is mounted on the door frame 12 of the vehicle front door, and is annular as a whole. The weather strip 11 comprises: one molded section 13 (cf. FIG. 2) which is positioned on the corner part of the rear side upper section; and one extrusion section 14 which is formed by extrusion. The molded section 13 is so formed as to connect both ends of the extrusion section 14. In the embodiment, the weather strip 11 is made of EPDM (ethylene-propylene-diene terpolymer) sponge rubber.

The extrusion section 14 is fundamentally made up of a base section 15 which is mounted on the door frame 12, and a sealing section 17 which is extended from the base section 15 and has a hollow 16 (the molded section 13 being the same in fundamental construction). The base section 15 is secured to the door framed 12 through a double coated adhesive tape 18 or with a clip (not shown).

Figure 4:
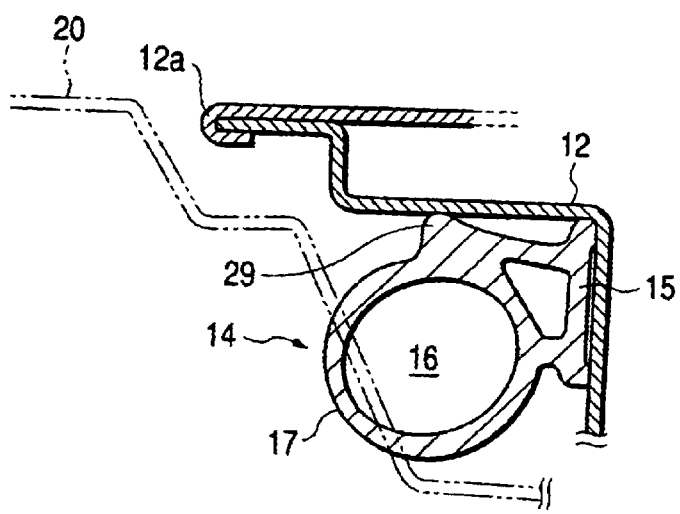
FIG. 4 is a sectional view taken along line IV—IV of FIG. 1 showing the coupling of the weather strip to the front door.
Figure 5:
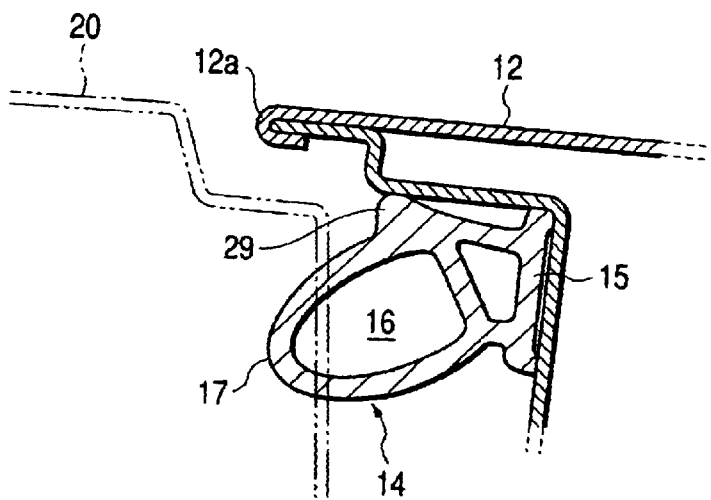
FIG. 5 is a sectional view taken along line V—V of FIG. 1 showing the coupling of the weather strip to the front door.

As shown in FIG. 3, the part of the extrusion section 14 which corresponds to the region of from the upper section of the door frame 12 to the front side section (on the left side of FIG. 1) is so formed that a seal lip 19 and a back lip 29 are extended outwardly with respect to the sealing section 17 and are integral with each other. Hereinafter, this parts is defined as a first part for the explanation. As shown in FIG. 4, the length of the seal lip 19 is gradually decreased at a corner part between the upper section (the first part) and the front side section. Hereinafter, this corner part is defined as a second part. The sealing section 17 at the second part is substantially circular in section. That is, the sectional shape of the sealing section 17 is changed from substantial ellipse at the first part to substantial circle at the second part. Further, a contact portion with a vehicle body 20 is a side portion adjacent to the top portion of the sealing section 17 at the first part, however, it is changed to a top portion (a portion most separate from the base section) of the circular section of the sealing section 17 at the second part. In addition, as shown in FIG. 5, in the part of the extrusion section 14 which corresponds to the front side section (the part which corresponds to the hinge of the front door), no seal lip 19 is formed, and the back lip 29 is short. Hereinafter, this part is defined as a third part. The sealing section 17 at the third part is changed in section from the second part, so the sealing section 17 at the third part is so formed that it is elliptic in section, and is extended obliquely.

Figure 6:
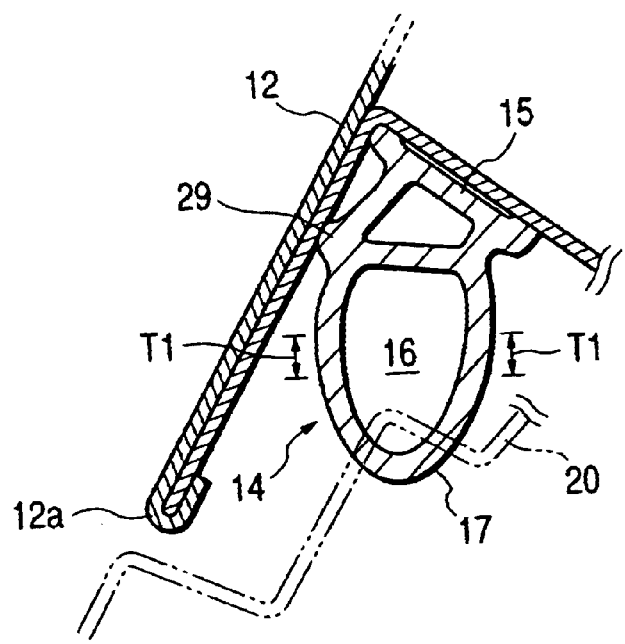
FIG. 6 is a sectional view taken along line VI—VI of FIG. 1 showing the coupling of the weather strip to the front door.

As shown in FIG. 6, in the part of the extrusion section 14 which corresponds to the corner part between the front side section and the lower section of the door frame 12, the height of the sealing section is larger than that of the other section (the front side section and the lower section). Hereinafter, this lower corner part is defined as a fourth part. That is, with respect to the part corresponding to the aforementioned corner, during extrusion, both side walls of the sealing section 17 are added to the same value substantially uniformly thickness over the height T1, and therefore the sealing section 17 is higher than the other sections.

Figure 7:
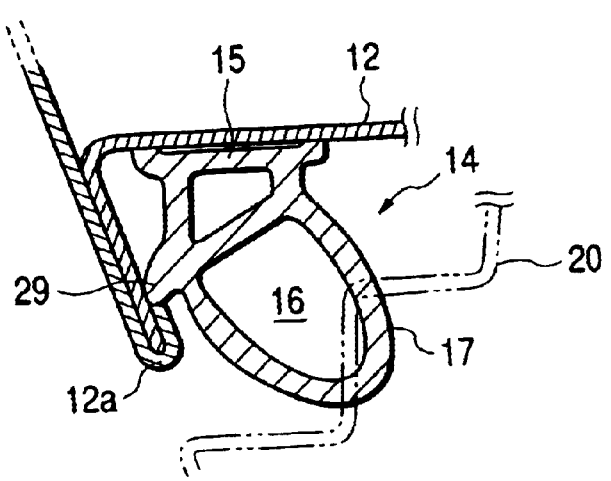
FIG. 7 is a sectional view taken along line VII—VII of FIG. 1 showing the coupling of the weather strip to the front door.

As shown in FIG. 7, in the part of the extrusion section 14 which corresponds to the lower section and a rear side section of the door frame 12 (Hereinafter, this section is defined as a fifth part.), and in at least the lower section of the fifth part, its thickness is smaller the thickness of the vehicle outside base end of the sealing section 17 of the part which corresponds to the upper section of the door frame 12.

A process of manufacturing the weather strip thus constructed will be described in brief. Devices used for the manufacture of the weather strip are not shown.

First, an extrusion machine is used, to extrude unvulcanized EPDM having a sectional configuration of the aforementioned extrusion section 14 through a die having a predetermined opening. In this case, a variable extrusion mechanism is used to cause the extrusion section 14 to have the above-described various sectional configurations. That is, the configuration of the extrusion opening of the die is variable according to the sectional shape of the weather strip.

Thereafter, the unvulcanized EPDM thus extruded is vulcanized with the vulcanizing machine, and then cooled.

Under this condition, a metal mold device is used to form the molded section 13 in such a manner as to connect both ends of the extrusion section 14. Thus, the above-described annular weather strip 11 has been manufactured.

Now, the functions and effects of the embodiment will be described.

(1) In the use of the weather strip 11, the hollow sealing section 17 extended from the base section 15 seals the gap between the door frame 12 and the vehicle body 20.

(2) The weather strip 11, the embodiment of the invention, is made up one extrusion section 14 and one molded section 13. Therefore, the number of manufacturing step is considerably small. Accordingly, the manufacturing work is high in efficiency, and the manufacturing cost is very low.

(3) In the region of from the upper section of the door frame 12 to the front side section (first part) has the sealing lip 19. Then, the seal lip 19 of the second part of the extrusion section 14 which corresponds to the upper corner part between the upper section of the door frame 12 and the front side section is so formed that its length is gradually decreased. Therefore, sealing force of the seal lip 19 may be equalized at the upper section of the door frame.

(4) Further, the third part of the extrusion section 14 corresponds to the front side section of the door frame 12. The sealing lip 19 is not formed at the third part. Therefore, it is possible to narrow the gap between the front side section and the vehicle body as compared with the gap at the first part. And it is possible to form a shape of the sealing section same as that of the conventional-type weather strip while the weather strip is from by one continuous extrusion.

(5) Furthermore, the fourth part of the extrusion section 14 which corresponds to the lower corner part between the front side section of the door frame 12 and the lower section is so formed that the height of the sealing section 17 is higher than the other parts (FIG. 6). Therefore, even if, when the weather strip is mounted on the door frame 12, the fourth part is bent and the sealing section 17 collapses somewhat; that is, it is deformed, the deformation is estimated in advance. That is, when the extrusion section 14 is bent, the height thereof is almost equal to the heights of the other parts. Accordingly, the sealing force will never be decreased.

(6) Especially, the fourth part corresponding to the lower corner part is as follows: in the extrusion work, both side walls of the sealing section 17 are added the same value substantially uniformly thickness, so that the height of the sealing section 17 is higher than the other sections. Hence, when the extrusion section is bent, the sealing section 17 thereof will collapse; that is, the right and left parts thereof are uniformly deformed. Accordingly, the above-described functions and effects are more positive.

(7) In addition, in the region corresponding to the upper section of the door frame 12, in order to deal with the suction deformation of the front door during the high speed driving, it is necessary to obtain a predetermined lap margin there by to increase the sealing force. Therefore, the sealing section 17 should have a predetermined thickness. On the other hand, the part corresponding at least to the lower section of the door frame 12, is less in the above-described requirement than the part corresponding to the upper section. On the other hand, if the whole sealing force is too great, the front door closing force is increased.

(8) In view of the foregoing, the thickness of the fifth part which corresponds at least to the lower section of the door frame 12 is smaller than the thickness of the vehicle outside base end part of the sealing section 17 of the part corresponding to the upper section, and therefore, the front door closing force can be decreased. As a result, at the time of closing the door, the operability is improved.

(9) And, because of this fact, the amount of material used can be decreased as a whole. As a result, the amount of EPDM used can be decreased, and the manufacturing cost can be decreased.

(10) In the embodiment, in addition to the above-described functions and effects of (3) through (6) and (8), the following sealing effect is obtained: that is, at any section sealing effect is substantially equal.

(11) In the method of manufacturing the weather strip 11 according to the invention, the weather strip 11 having the above-described functions and effects can be positively obtained.

The invention is not limited to the above-described embodiment; that is, it will be obvious to those skilled in the art that various changes and modifications may be made therein without departing from the spirit of the invention as follows:

(a) In the above-described embodiment, the weather strip 11 is made of one kind of rubber (EPDM sponge rubber). The material may be suitably replaced other materials. For instance, the molded section 13 may be formed with EPDM solid rubber or thermoplastic elastomer.

(b) In the above-described embodiment, in the part of the extrusion section 14 which corresponds to the upper corner part between the upper section of the door frame 12 and the front side section, the length of the seal lip 19 is gradually decreased. However, in all the regions of the upper section, if the sealing force of the seal lip 19 will be equal, the seal lip 19 may be gradually changed in length.

Second Embodiment

The second embodiment embodied in the sealing structure of the invention will hereinafter be described with reference to FIGS. 8 to 10A. FIG. 9 is a front view of the front door weather strip which is mounted on the right-side front door as seen from the inside of the vehicle cabin, and FIGS. 10A to 10D are expanded sectional views taken along lines Xa—Xa, Xb—Xb, Xc—Xc, and Xd—Xd, respectively, of FIG. 9.

Figure 8:
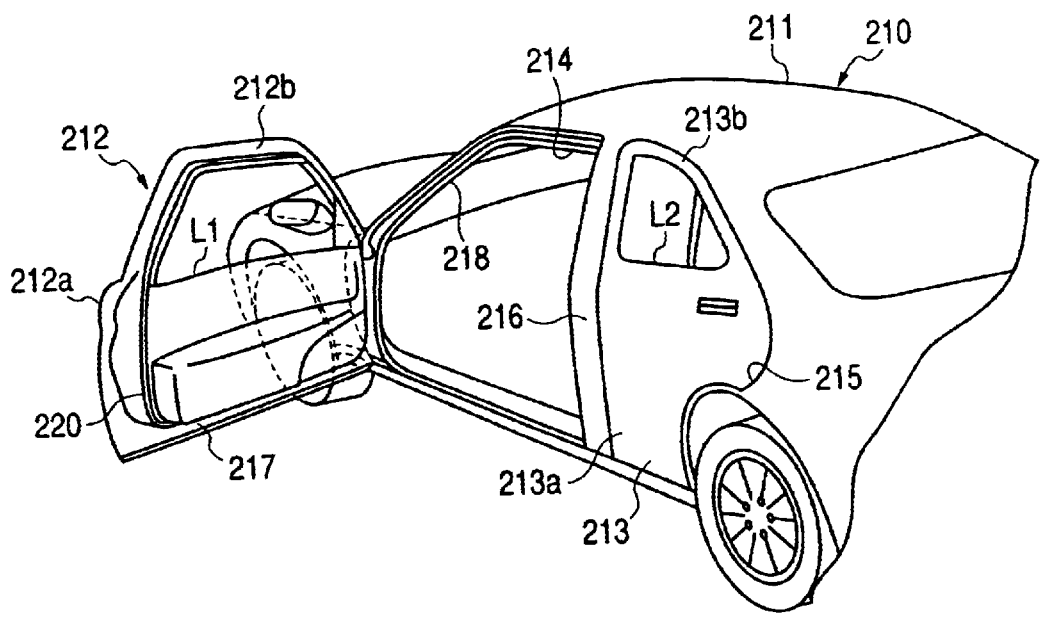
FIG. 8 is a partial perspective view of a vehicle for which the sealing structure according to the present invention is adapted.
Figure 9:
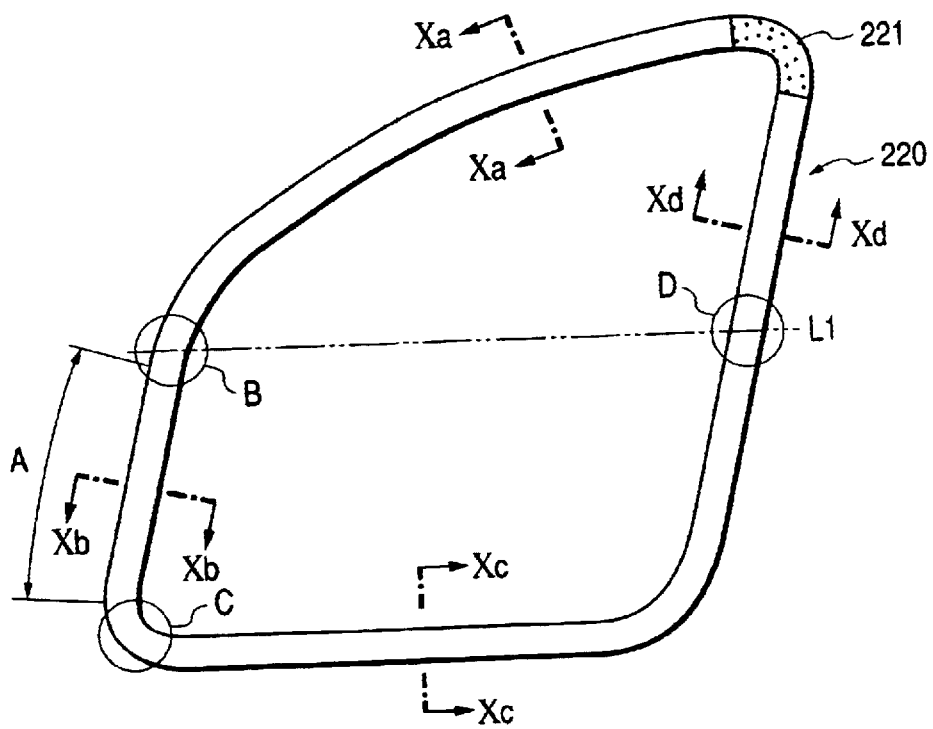
FIG. 9 is a side view showing the front door weather strip of FIG. 8.

As shown in FIG. 8, in the vehicle body 211 of the vehicle 210 for which this sealing structure is adopted, the front doors 212 as a pair are each openably/closeably supported in the side portion on the front side of the vehicle body 211, and the rear doors 213 as a pair (only the respective left-side doors of both front and rear doors are shown in FIG. 8) each, in the side portion on the rear side thereof. Then, in the vehicle body 211, the opening section 214 for the front door is formed in the portion corresponding to the front door 212, whereas the opening section 215 for the rear door, in the position corresponding to the rear door 213, and the center pillar portion 216 constituting part of the peripheral portion of each opening section 214, 215 is formed between the opening sections 214, 215.

The front door 212 includes the door body portion 212a, the door sash portion 212b provided in inverted U-shape in the upper portion of the door body portion 212a, etc. Also, in the front door 212, the front door weather strip (hereinafter referred to simply as a "weather strip") 220 as the weather strip is mounted on the peripheral portion 217 on the vehicle interior side by way of a not-shown double coated adhesive tape and clip. Then, when the front door 212 is changed from the open state (the state shown in FIG. 8) to the closed state to occlude the opening section 214 for the front door 212, the undermentioned hollow sealing section 224 of the weather strip 220 is elastically in contact with the peripheral portion of the opening section 214 for the front door 212. Thereby, the inside and outside of the vehicle 210 cabin is sealed air-tight and water-tight with the front door 212 being closed.

Also, the weather strip 220 is formed of an elastic material such e.g. as ethylene-propylene-diene terpolymer (EPDM) etc. Then, as shown in FIG. 9, the weather strip 220, which is annularly formed as a whole, is constituted by one molded section 221 formed in substantially L-shape by the molding method, and any other portion or the extrusion section 222 continuously formed by the variable extrusion method using the variable die. Here, the molded section 221 is formed so as to correspond to the rearward upper portion of the door sash portion 212b, i.e., the corner part of the upper portion on the center pillar portion 216 side.

As shown in FIG. 10, the extrusion section 222 basically includes the base section 223 which is mounted on the peripheral portion 217 of the front door 212, and the hollow sealing section 224 formed integrally with the base section 223. Also, although not shown in the figure, the molded section 221 also includes the base section and sealing section formed so as to continue respectively to the base section 223 and sealing section 224 of the extrusion section 222. Namely, the weather strip 220 includes the base section and the sealing section as its basic constituent elements, and is formed such that the base section 223 and the sealing section 224 each have the sectional form which is substantially identical all over the periphery.

Also, in the extrusion section 222 of the weather strip 220, a hollow unthickened portion 225 is formed within the base section 223 thereof. Also, in the extrusion section 222, a back lip 226 is outwardly projectingly formed on the external surface of the sealing section 224 other than the forward side portion (the portion shown by symbol A in FIG. 9) of the extrusion section 222. Further, the back lip 226 is formed such that the height thereof is gradually changed in the vicinity of each end portion of the forward side portion of the extrusion section 222. By the use of such a weather strip 220, it follows that when the front door 212 is closed, the sealing section 224 is elastically in contact with the peripheral portion 218 of the opening section 214 for the front door 212 all over the periphery, and the inside and outside of the vehicle cabin is sealed air-tight and water-tight.

Figure 10A:
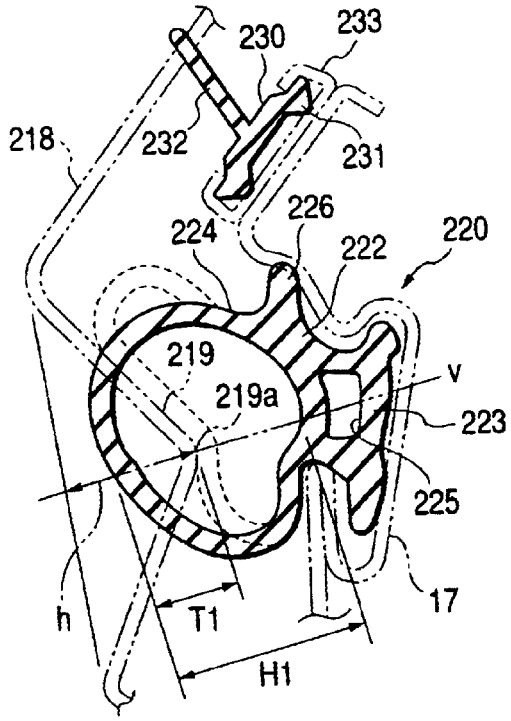
FIGS. 10A to 10D are sectional views taken along lines Xa—Xa, Xb—Xb, Xc—Xc, and Xd—Xd, respectively, in FIG. 9.
Figure 10B:
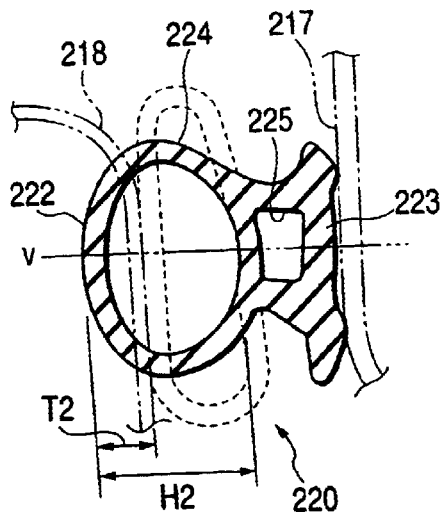
Figure 10C:
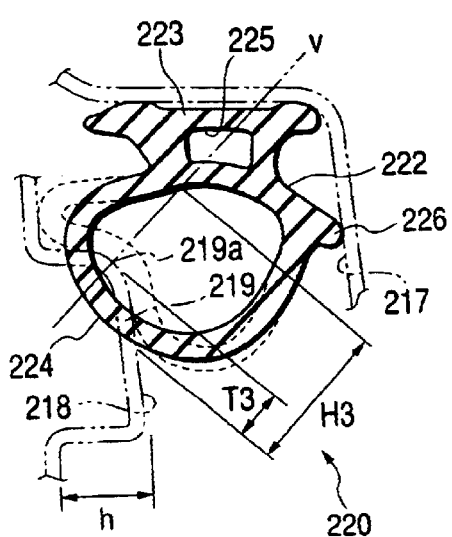
Figure 10D:
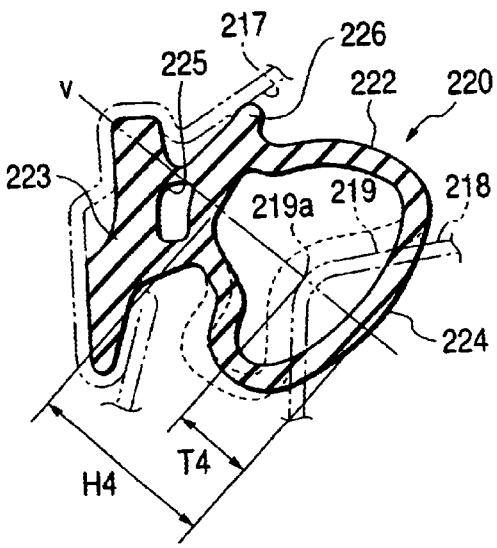

In this embodiment, the ridge portion 219 (refer to FIG. 10A) is formed along the peripheral portion other than the forward portion of the peripheral portion 218. Then, as shown in FIGS. 10A, 10C, and 10D, with the front door 212 being closed, in the portion in which the ridge portion 219 is formed, the sealing section 224 of the weather strip 220 is arranged to be elastically deformed in the direction of compression while being pressed and extended in opposite directions away from the top portion 219a, or peak, of the ridge portion 219.

Also, the height H2, H3 in the direction v of intrusion of the ridge portion 219 of the sealing section 224 corresponding to the portion below the vicinity of the belt line portion L1 which is the joining portion between the door body portion 212a and door sash portion 212b of the front door 212 is set to be lower than the height H1, H4 of the sealing section 224 corresponding to the portion above the vicinity of the belt line portion L1.

Also, in order to change the height H of the sealing section 224 as described above, the sectional form of the extrusion section 222 is arranged to be gradually changed in the vicinity of the portion corresponding to the belt line portion L1 shown by symbols B and D in FIG. 9. Namely, in the portion shown by symbol B, the sectional form of the weather strip 220 is arranged to be gradually changed from that shown in FIG. 10A to that shown in FIG. 10B. Also, in the portion shown by symbol D, the sectional form thereof is arranged to be gradually changed from that shown in FIG. 10C to that shown in FIG. 10D.

Further, in the portion shown by symbol C in FIG. 9, since the extrusion section 222 comes to be largely bent, the sealing section 224 is easy to collapse, and the sealing properties tend to be insufficient. In order to suppress such deterioration in sealing properties, even with the extrusion section 222 being largely bent, in the closed state of the front door 212, the sealing section 224 is arranged to be elastically deformed by a predetermined amount by the ridge portion 219 on the opening edge portion 218 of the opening section 214 for the front door 212 of the vehicle body 211. Namely, the sealing section 224 in the portion shown by symbol C in FIG. 9 is formed so as to be slightly higher than any other portion. Also, this height of the sealing section 224 is gradually increased toward the lower side portion side from the forward side portion, maximized in the center of the bending portion, and again gradually reduced. Moreover, in this portion shown by symbol C, the sectional form thereof is gradually changed from that shown in FIG. 10B to that shown in FIG. 10D.

Also, as shown in FIG. 10A, in the front door 212, a sealing member 230 formed separately from the weather strip 220 is provided in at least part of the door sash portion 212b thereof. The sealing member 230 includes a base 231 which is mounted on the retainer 233 provided on the door sash portion 212b, and a lip 232 elastically abutting the peripheral portion 218 of the opening section.

The manufacturing procedure of the weather strip 220 will now be described in brief. Further, the diagrammatic representation of the apparatus etc. for use in such manufacture will be omitted here. First, the elastic material having the sectional form of the extrusion section 222 is extruded from the die having a predetermined opening portion by the use of an extrusion machine. At this time, various kinds of sectional forms having the aforesaid features are imparted to the extrusion section 222 by a variable extrusion mechanism. Thereafter, by the use of a die apparatus, the molded section 221 is molded so as to be connected to each end portion of the extrusion section 222.

Accordingly, the following effects can be attained according to this embodiment.

(1) The weather strip 220 for use in this sealing structure includes only one molded section 221. Thus, upon closing the front door 212, the reaction force by the sealing section 224 of the molded section 221, i.e., the force acting in the direction in which the front door 212 is changed from the closed state to the open state, is suppressed from being increased. Also, in the peripheral portion 218 of the opening section, the ridge portion 219 is provided as along the peripheral portion thereof, and in the closed state of the front door 212, the sealing section 224 of the weather strip 220 is arranged to be elastically deformed in the direction of compression while being pressing extended in opposite direction away from the top portion 219a of the ridge portion 219. Thereby, the sealing section 224 is deformed without being largely moved from its mounting position, and also a sliding friction force becomes difficult to generate between the sealing section 224 and the peripheral portion 218 of the opening section. Consequently, the reduction in door closing force upon closing the front door 212 can be achieved, and the feeling of closing the door can be improved.

(2) Conventionally, the sealing lip is sometimes formed on the weather strip in order to improve sealing properties, sound insulating properties, etc. However, the sealing lip is relatively large in size, and moreover is formed such that the sealing lip is gradually changed in height in each longitudinal end portion. Hence, also in the variable extrusion method using the variable die, an advanced technique has been required to form the sealing lip. In contrast, in this sealing structure, the sealing member 230 formed separately from the weather strip 220 is mounted on at least part of the door sash portion 212b of the front door 212. Thus, there is no need for forming the sealing lip on the weather strip 220. Thereby, the change in sectional form of the extrusion section 222 of the weather strip 220 is reduced, so that the weather strip 220 can be easily formed by the variable extrusion method using the variable die.

(3) In this sealing structure, the height H2, H3 of the sealing section 224 in the portion below the vicinity of the belt line portion L1 of the front door 212 is set to be lower than the height H1, H4 of the sealing section 224 in the portion above the vicinity of the belt line portion L1. Thus, the amount of elastic deformation of the sealing section 224 in the portion below the vicinity of the belt line portion L1 can be reduced, and the sliding friction force caused between the sealing section 224 and the peripheral portion 218 of the opening section can be further reduced upon closing the front door 212. Consequently, the feeling of closing the front door 212 can be further improved. Further, the sealing properties of the weather strip 220 which are required of the portion below the vicinity of the belt line portion L1 of the front door 212 are smaller than the sealing properties which are required of the portion above the belt line portion L1. Hence, even if the height H of the sealing section 224 is thus reduced, no hindrance is constituted to the sealing properties.

(4) In this structure, it is arranged that the sectional form of the weather strip 220 is gradually changed in the vicinity of the portion corresponding to the belt line portion L1 of the weather strip 220. Thus, the height H of the sealing section 224 is gradually changed, whereby a smooth continuation in sectional form is available between the upper side potion which heavily requires sealing properties and the lower side portion which relatively lightly requires sealing properties. Consequently, no step is produced in either of these portions of the weather strip 220, and the sealing properties by the sealing section 224 in the vicinity of the belt line portion L1 can be maintained in good conditions.

Third Embodiment

Figure 11:
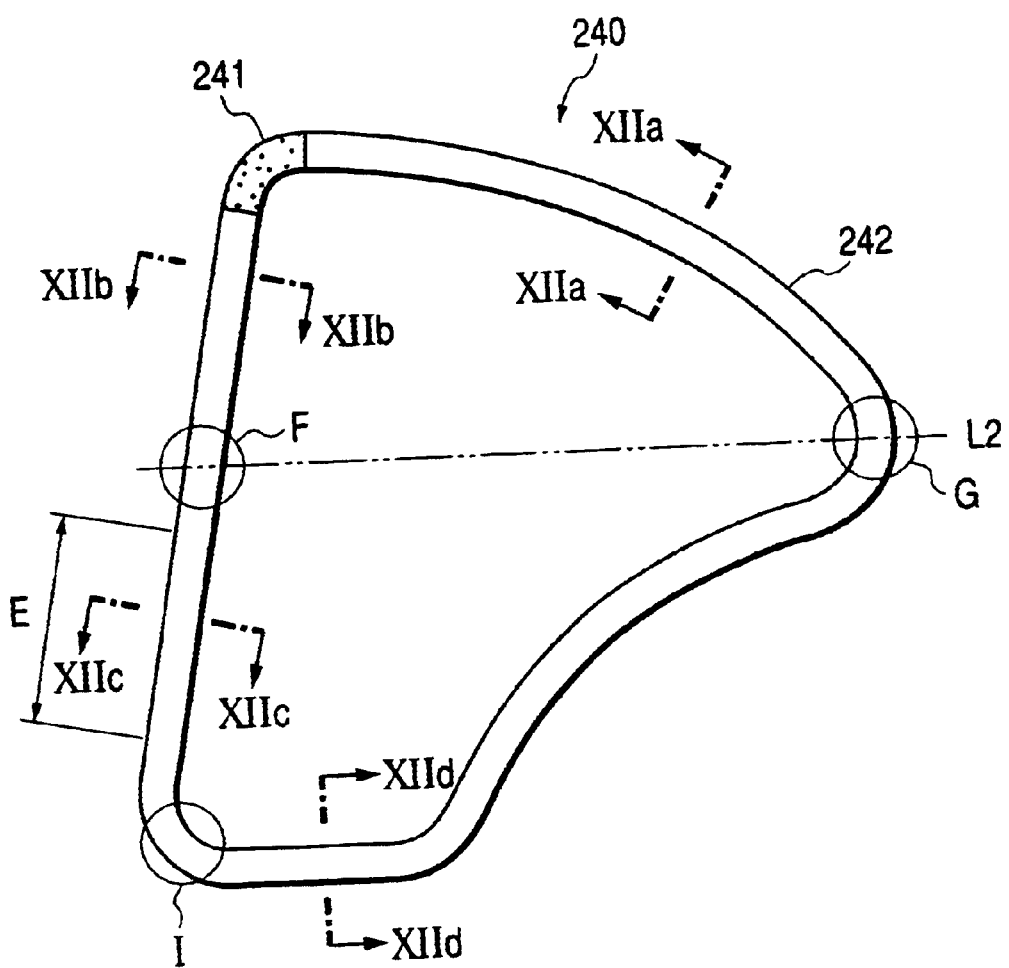
FIG. 11 is a side view of the rear door weather strip of a third embodiment.
Figure 12A:
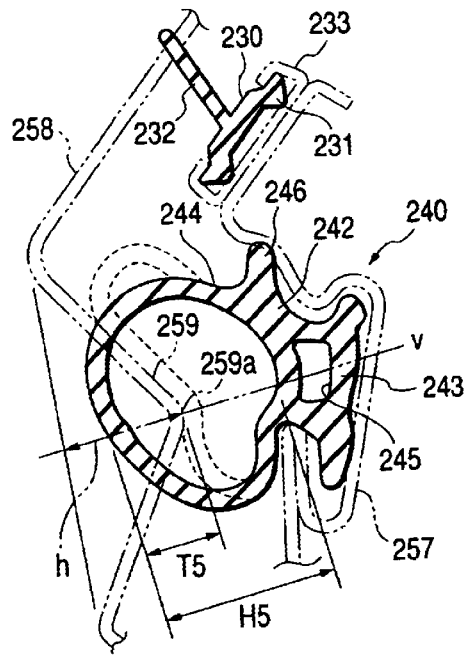
FIGS. 12A to 12D are sectional views taken along lines XIIa—XIIa, XIIb—XIIb, XIIc—XIIc, and XIId—XIId, respectively, in FIG. 11.

The third embodiment of the invention will now be described laying stress on the different portions from those of the second embodiment with reference to FIGS. 8, 11, and 12A. Further, FIG. 11 is a front view of the rear door weather strip which is mounted on the right-side rear door as seen from the inside of the vehicle cabin, and FIGS. 12A to 12D are expanded sectional views taken along lines XIIa—XIIa, XIIb—XIIb, XIIc—XIIc, and XIId—XIId, respectively, of FIG. 11. Furthermore, in FIGS. 11 and 12A, the same arrangements as those of FIGS. 9 and 10A shown above are given the same numerals.

The sealing structure of this third embodiment is different from that of the second embodiment in that the inside and outside of the vehicle cabin is sealed using the rear door weather strip provided between the vehicle body and the rear door.

The rear door weather strip (hereinafter referred to simply as a "weather strip") 240 for use in the sealing structure of this embodiment is mounted on the vehicle-interior-side peripheral portion 217 of the rear door 213 shown in FIG. 8 by way of a not-shown double coated adhesive tape and clip. The rear door 213 includes the door sash portion 213b provided in inverted U-shape on the door body portion 213a and the upper portion of the door body portion 213a, etc. Then, when the rear door 213 is changed from the open state to the closed state to occlude the opening section 215 for the rear door 213, the undermentioned hollow sealing section 244 of the weather strip 240 is arranged to be elastically in contact with the peripheral portion 258 of the opening section 215 for the rear door 213. Thereby, the inside and outside of the vehicle 210 cabin is sealed air-tight and water-tight with the rear door 213 being closed.

As shown in FIG. 11, the weather strip 240, which is annularly formed as a whole, is constituted by one molded section 241 formed in substantially L-shape by the molding method, and any other portion or the extrusion section 242 continuously formed by the variable extrusion method using the variable die. Here, the molded section 241 is formed so as to correspond to the forward upper portion of the door sash portion 213b, i.e., the corner part of the upper portion on the center pillar portion 216 (refer to FIG. 8) side.

As shown in FIG. 12A, the extrusion section 242 basically includes the base section 243 which is mounted on the peripheral portion 257 of the rear door 213, and the hollow sealing section 244 formed integrally with the base section 243. Also, although not shown in the figure, the molded section 241 also includes the base section and sealing section formed so as to continue respectively to the base section 243 and sealing section 244 of the extrusion section 242. Namely, the weather strip 240 includes the base section and the sealing section as its basic constituent elements, and is formed such that the base section 243 and the sealing section 244 each have the sectional form which is substantially identical all over the periphery.

Also, in the extrusion section 242 of the weather strip 240, the hollow unthickened portion 245 is formed within the base section 243 thereof. Also, in the extrusion section 242, the back lip 246 is outwardly projectingly formed on the external surface of the sealing section 244 other than the forward lower portion (the portion shown by symbol E in FIG. 11) of the extrusion section 242. Further, the back lip 246 is formed such that the height thereof is gradually changed in the vicinity of each end portion of the forward lower portion of the extrusion section 242. By the use of such a weather strip 240, it follows that when the rear door 212 is closed, the sealing section 244 elastically abuts the peripheral portion 258 of the opening section 215 for the rear door 213 all over the periphery, and the inside and outside of the vehicle cabin is sealed air-tight and water-tight.

Figure 12B:
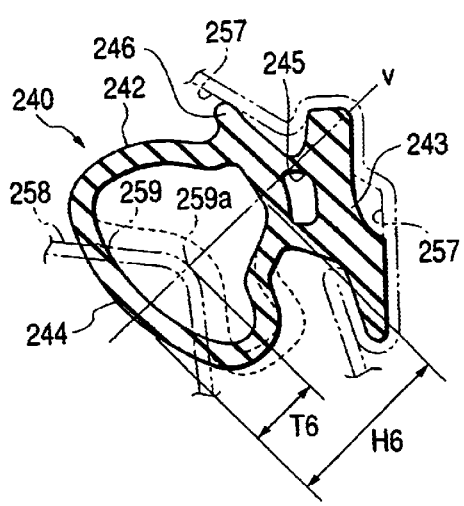
Figure 12C:
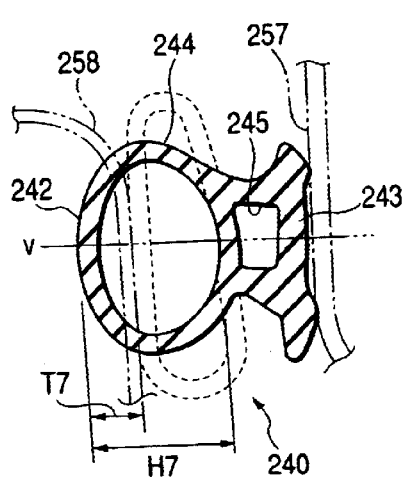
Figure 12D:
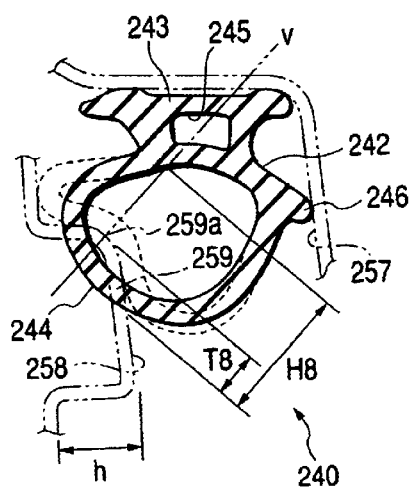
Figure 13:
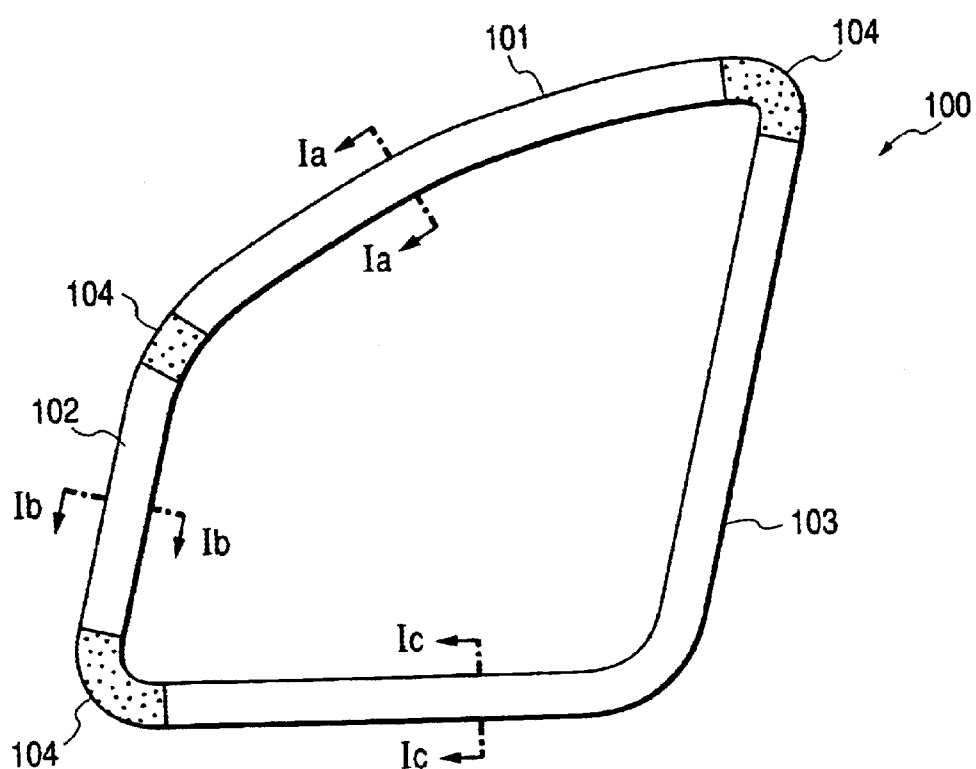
FIG. 13 is a front view of a conventional weather strip.
Figure 14A:
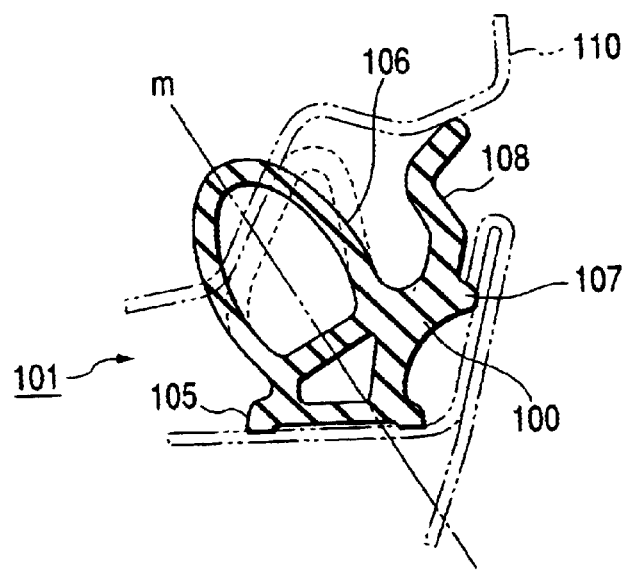
FIGS. 14A to 14C are sectional views taken along lines Ia—Ia, Ib—Ib, and Ic—Ic, respectively, in FIG. 13.
Figure 14B:
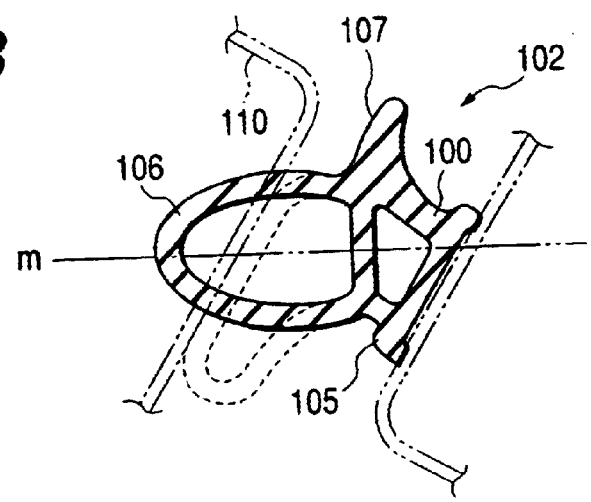
Figure 14C:
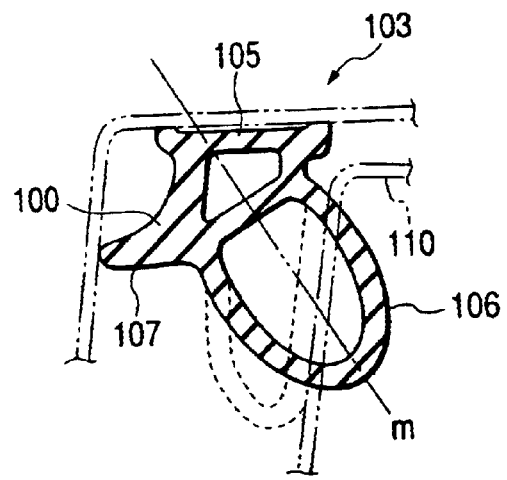

In this embodiment, the ridge portion 259 is formed as along the peripheral portion other than the forward lower portion of the peripheral portion 258. Then, as shown in FIGS. 12A, 12B, and 12D, with the rear door 213 being closed, in the portion in which the ridge portion 259 is formed, the sealing section 244 of the weather strip 240 is arranged to be elastically deformed in the direction of compression while being pressed and extended in opposite directions away from the top portion 259a of the ridge portion 259.

Also, the height H7, H8 in the direction of intrusion of the ridge portion 259 of the sealing section 244 corresponding to the portion below the vicinity of the belt line portion L2 which is the joining portion between the door body portion 213a and door sash portion 213b of the rear door 213 is set to be lower than the height H5, H6 of the sealing section 244 corresponding to the portion above the vicinity of the belt line portion L2.

Also, in order to change the height H of the sealing section 244 as described above, the sectional form of the extrusion section 242 is arranged to be gradually changed in the vicinity of the portion corresponding to the belt line portion L2 shown by symbols F and G in FIG. 11. Namely, in the portion shown by symbol F, the sectional form of the weather strip 240 is arranged to be gradually changed from that shown in FIG. 12B to that shown in FIG. 12C. Also, in the portion shown by symbol G, the sectional form thereof is arranged to be gradually changed from that shown in FIG. 12D to that shown in FIG. 12A.

Further, the sealing section 244 in the portion shown by symbol I in FIG. 11 is formed so as to be slightly higher than any other portion. Also, this height of the sealing section 244 is gradually increased toward the rear side from the center pillar portion 216 side, maximized in the center of the bending portion, and again gradually reduced. Moreover, in this portion shown by symbol I, the sectional form thereof is gradually changed from that shown in FIG. 12C to that shown in FIG. 12D.

Also, as shown in FIG. 12A, in the rear door 213, the sealing member 30 formed separately from the weather strip 240 is provided in at least part of the door sash portion 213b of the rear door 213.

Therefore, according to this embodiment, the effects in proportion to the effects described in (1) to (4) of the second embodiment can be attained.

Further, each embodiment of the invention may be modified as follows.

Each aforesaid embodiment is arranged such that the sectional form of the extrusion section 222, 242 is gradually changed in the vicinity of the belt line portion L1, L2 in both the forward and rearward side portions of the extrusion section 222, 242. Alternatively, the sections in which the sectional form is gradually changed are not necessarily both aforesaid sections, but depending on the sectional form of the extrusion section 222, 242, it may be gradually changed in only either of both these sections.

Also, the portion in which the sectional form is thus gradually changed is not necessarily the vicinity of the belt line portion L1, L2, but it may be the portion other than the vicinity of the belt line portion L1, L2 in the extrusion section 222, 242. If so done, the position and number of the portion in which the sectional form is gradually changed can be set at discretion in accordance with the sectional form of the extrusion section 222, 242. Particularly, in the portion large in bend, it is preferable that the height of the sealing portion 224, 244 is gradually changed in order to make up for the insufficiency of sealing properties due to the collapse of the sealing portion 224, 244.

Also, in each aforesaid embodiment, the height H2, H3, H7, H8 of the sealing section 224, 244 in the portion below the vicinity of the belt line portion L1, L2 in the extrusion section 222,242 is set to be lower than the height H1, H4, H5, H6 of the sealing section 224, 244 in the upper portion of the portion below the vicinity of the belt line portion L1, L2. However, the height H of the sealing section in each of these portions is not necessarily thus set. For example, this may be arranged such that the height H3, H80 of the sealing portion 224, 244 in the lower side portion of the extrusion section 222, 242 is set to be lower than the height H1, H2, H4 to H7 of the sealing section 224, 244 in any other portion.

Also, in stead of setting the height H of the sealing section 224, 244 as described above, for example, the projection height $\underline{h}$ (refer to FIGS. 10A and 12A) of the ridge portion 219, 259 in the peripheral portion 218, 258 of the opening section of the vehicle body 211 corresponding to the portion below the vicinity of the belt line portion L1, L2 may be set to be lower than the height in any other portion. In amount, in the closed state of the door 212, 213, the amount of elastic deformation T (refer to FIGS. 10A and 12A) of the sealing section 224, 244 in the portion below the vicinity of the belt line portion L1, L2 need only be set to be smaller than the amount of elastic deformation in any other portion. Further, in FIGS. 10A and 12A, the variation width between before and after the elastic deformation of the sealing section 224, 244 in the direction of intrusion of the ridge portion 219, 259 is used as the amount of elastic deformation T. Alternatively, instead of this variation width, for example, the volume which is reduced due to the elastic deformation of the sealing section 224, 244, etc., may be used.

Also, in each aforesaid embodiment, it is arranged that the sealing member 230 is provided, and alternatively this sealing member may be omitted.

Also, in each aforesaid embodiment, there is cited an example of the vehicle which includes a pair of front doors 212 and a pair of rear doors 213. Alternatively, this embodiment may be applied to the case in which the door weather strip is mounted on the side door in the vehicle including a pair of side door (the so-called two-door car, three-door car), and the front door, side door, rear door, or the like in the vehicle including a pair of front doors and one rear door, the vehicle including a pair of front doors and the sliding door sliding along the side portion of the vehicle, and in the vehicle including a pair of front doors, one rear door, and one sliding door. If so done, in the vehicle including a pair of side doors, the pillar portion provided on the rearward side of the side door is made equivalent to the center pillar portion 216.

In the above description, each embodiment has been explained separately, features in each embodiment can be combined into the possible extent.

As was described above, with the door weather strip according to the present invention, the manufacturing work is improved in efficiency, and the manufacturing cost is decreased. And any parts of the weather strip are substantially equal in sealing performance.

Further, any parts of the weather strip are more positively equal in sealing performance.

Further, according to the door weather strip manufacturing method according to the present invention, the weather strip having the above-described effects can be positively obtained.

Further, it is possible to cause a sliding friction force to be difficult to generate between the hollow sealing section and the opening edge portion at the time of closing the front or rear door. Consequently, the reduction in door closing force upon closing the door can be achieved, and the feeling of closing the door can be improved. Also, the sealing properties upon closing the door can be improved.

Still further, the portion other than the molded section in the weather strip can be easily formed by the variable extrusion method using the variable die.

Still further, upon closing the door, the sliding friction force produced between the sealing section and the peripheral portion of the opening edge section can be further reduced, and the feeling of closing the door can be further improved.

Still further, the amount of elastic deformation of the sealing section in the portion below the vicinity of the belt line portion can be reduced.

Still further, the upper side portion and lower side portion in the vicinity of the belt line portion of the weather strip which are different in degree of requirement for sealing properties can be smoothly continued one to the other.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. In a vehicle, a sealing structure for sealing between a body of the vehicle and a door of the vehicle, the combination comprising:
 a weather strip located on the door, wherein the weather strip includes:
  a molded corner section corresponding to an upper corner of the door; and
  a continuous extrusion section, wherein the extrusion section forms the entire weather strip other than the molded corner, wherein the extrusion section includes:
   a first part corresponding to a region from an upper section to a corner part of a frontward upper section of the door;
   a second part corresponding to a corner part between the upper section and a frontward section of the door;
   a third part corresponding to the frontward section;
   a fourth part corresponding to a corner part between the frontward section and a lower section of the door; and
   a fifth part corresponding to the lower section and a rearward section of the door;
  a base section that is attachable to a peripheral surface of the door, wherein the base section is formed on both the extrusion section and the corner section; and
  a hollow sealing section that is integrally formed with the base section, wherein the hollow sealing section elastically abuts a surface of the body when the door is closed; and a ridge formed along at least a part of the surface of the body that corresponds to the first part, wherein, when the door is closed, the sealing section is elastically deformed by the ridge in opposite directions away from a peak of the ridge.

2. The combination according to claim 1, wherein the structure includes a sealing member that is separate from the weather strip, wherein the sealing member is attached to at least one of an upper peripheral surface and a side peripheral surface of the door.

3. The combination according to claim 1, wherein the degree of elastic deformation of the hollow sealing section at locations substantially below a belt line of the door is less than that substantially above the belt line, when the door is closed.

4. The combination according to claim 1, wherein a height dimension of the hollow sealing section, as measured in a direction of intrusion of the body with respect to the sealing section, is less at locations substantially below a belt line of the door than at locations substantially above the belt line.

5. The combination according to claim 1, wherein a projection height of the ridge is lower at locations substantially below the belt line than at locations substantially above the belt line.

6. The combination according to claim 1, wherein the cross sectional shape of at least one of a forward and rearward portion of the weather strip gradually changes at a location that is in close proximity to a belt line of the door.

7. In a vehicle, a sealing structure for sealing between a body of the vehicle and a door of the vehicle, the combination comprising:

a weather strip located on the door, wherein the weather strip includes:
   a molded corner section corresponding to an upper corner of the door; and
   a continuous extrusion section, wherein the extrusion section forms the entire weather strip other than the molded corner, wherein the extrusion section includes:
      a first part corresponding to a region from an upper section to a corner part of a frontward upper section of the door;
      a second part corresponding to a corner part between the upper section and a frontward section of the door;
      a third part corresponding to the frontward section;
      a fourth part corresponding to a corner part between the frontward section and a lower section of the door; and
      a fifth part corresponding to the lower section and a rearward section of the door;
   a base section that is attachable to a peripheral surface of the door, wherein the base section is formed on both the extrusion section and the corner section; and
   a hollow sealing section that is integrally formed with the base section, wherein the hollow sealing section elastically abuts a surface of the body when the door is closed; and a ridge formed along at least a part of the surface of the body that corresponds to the first part, wherein, when the door is closed, the ridge contacts the hollow sealing section at substantially the center of the hollow sealing section such that opposite sides of the sealing section are elastically deformed by the ridge in substantially opposite respective directions.

8. The combination according to claim 7, wherein the structure includes a sealing member that is separate from the weather strip, wherein the sealing member is attached to at least one of an upper peripheral surface and a side peripheral surface of the door.

9. The combination according to claim 7, wherein the degree of elastic deformation of the hollow sealing section at locations substantially below a belt line of the door is less than that substantially above the belt line, when the door is closed.

10. The combination according to claim 7, wherein a height dimension of the hollow sealing section, as measured in a direction of intrusion of the body with respect to the sealing section, is less at locations substantially below a belt line of the door than at locations substantially above the belt line.

11. The combination according to claim 7, wherein a projection height of the ridge is lower at locations substantially below the belt line than at locations substantially above the belt line.

12. The combination according to claim 7, wherein the cross sectional shape of at least one of a forward and rearward portion of the weather strip gradually changes at a location that is in close proximity to a belt line of the door.

* * * * *